(12) United States Patent
Brockhaus et al.

(10) Patent No.: US 12,413,426 B2
(45) Date of Patent: Sep. 9, 2025

(54) PROVIDING A PROOF OF ORIGIN FOR A DIGITAL KEY PAIR

(71) Applicant: Siemens Aktiengesellschaft, Munich (DE)

(72) Inventors: Hendrik Brockhaus, Unterbiberg (DE); Jens-Uwe Busser, Neubiberg (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 191 days.

(21) Appl. No.: 17/429,544

(22) PCT Filed: Feb. 7, 2020

(86) PCT No.: PCT/EP2020/053131
§ 371 (c)(1),
(2) Date: Aug. 9, 2021

(87) PCT Pub. No.: WO2020/165041
PCT Pub. Date: Aug. 20, 2020

(65) Prior Publication Data
US 2022/0158852 A1   May 19, 2022

(30) Foreign Application Priority Data
Feb. 12, 2019   (EP) .................... 19156685

(51) Int. Cl.
*H04L 9/08*  (2006.01)
*H04L 9/32*  (2006.01)

(52) U.S. Cl.
CPC .......... *H04L 9/3268* (2013.01); *H04L 9/0825* (2013.01)

(58) Field of Classification Search
CPC ... H04L 9/3268; H04L 9/0825; H04L 9/0872; H04L 9/3263; H04L 9/006
See application file for complete search history.

(56) References Cited

U.S. PATENT DOCUMENTS 7,382,875 B2 * 6/2008 Girault .................... H04L 9/302
380/28
10,003,467 B1   6/2018 Miller et al.
(Continued)

FOREIGN PATENT DOCUMENTS

CN    1801029 A   7/2006  ............... G06F 1/00
CN  102577229 A   7/2012  ............... H04L 9/14
(Continued)

OTHER PUBLICATIONS

Search Report for International Application No. PCT/EP2020/053131, 14 pages.
(Continued)

*Primary Examiner* — Hany S. Gadalla
(74) *Attorney, Agent, or Firm* — Slayden Grubert Beard PLLC

(57) ABSTRACT

Various embodiments include a method for providing a proof of origin for a digital key pair comprising: generating the digital key pair at an origin specified by a device, wherein the origin comprises a security module of the device, wherein the digital key pair includes a private key stored in the security module protected against access; and providing the proof of origin confirming generation of the digital key pair at the origin, wherein the proof of origin is protected by a secret key provided by the device, wherein the secret key is stored in the security module; and issuing the public key of the digital key pair together with the proof of origin.

10 Claims, 2 Drawing Sheets

(56) References Cited

U.S. PATENT DOCUMENTS

| | | | |
|---|---|---|---|
| 2005/0135606 A1 | 6/2005 | Brown | 380/28 |
| 2009/0209232 A1* | 8/2009 | Cha | H04L 63/06 455/411 |
| 2011/0099367 A1 | 4/2011 | Thom et al. | 713/156 |
| 2013/0132721 A1 | 5/2013 | Busser | 713/168 |
| 2013/0333017 A1 | 12/2013 | Lukas | 726/10 |
| 2014/0025944 A1* | 1/2014 | Maletsky | G06F 21/57 713/150 |
| 2015/0095648 A1* | 4/2015 | Nix | H04L 9/0816 713/170 |
| 2016/0269393 A1* | 9/2016 | Corella | G06F 21/32 |
| 2016/0373418 A1* | 12/2016 | Ståhl | G06F 21/44 |
| 2017/0353435 A1 | 12/2017 | Pritikin | |
| 2018/0343127 A1* | 11/2018 | Campagna | H04L 9/0825 |
| 2019/0028281 A1* | 1/2019 | Turissini | G06F 21/57 |
| 2019/0052456 A1 | 2/2019 | Bygrave et al. | |
| 2019/0305938 A1* | 10/2019 | Sandberg-Maitland | H04L 9/085 |

FOREIGN PATENT DOCUMENTS

| | | | | |
|---|---|---|---|---|
| CN | 102868528 A | 1/2013 | | H04K 1/00 |
| CN | 108604985 A | 9/2018 | | G06F 21/62 |
| DE | 100 17 644 | 10/2001 | | H04L 9/28 |
| DE | 10 2010 033 231 | 2/2012 | | H04L 9/28 |
| DE | 10 2011 004 469 | 8/2012 | | H04L 9/32 |
| EP | 1796012 A1 | 6/2007 | | G06F 21/33 |
| EP | 3 288 215 | 2/2018 | | H04L 9/32 |
| WO | 2007/085726 A1 | 8/2007 | | H04L 9/32 |
| WO | 106453330 A | 2/2017 | | H04L 29/06 |

OTHER PUBLICATIONS

Chinese Office Action, Application No. 202080013501.7, 23 pages.
Chinese Notice of Allowance, Application No. 202080013501.7, 7 pages.

\* cited by examiner

PROVIDING A PROOF OF ORIGIN FOR A DIGITAL KEY PAIR

CROSS-REFERENCE TO RELATED APPLICATIONS

This application is a U.S. National Stage Application of International Application No. PCT/EP2020/053131 filed Feb. 7, 2020, which designates the United States of America, and claims priority to EP Application No. 19156685.0 filed Feb. 12, 2019, the contents of which are hereby incorporated by reference in their entirety.

TECHNICAL FIELD

The present disclosure relates to digital keys. Various embodiments of the teachings herein include methods for providing a proof of origin for a digital key pair, which is suitable in particular for requesting an authentication certificate, such as a digital certificate, in particular a device certificate.

BACKGROUND

The term "security" in the context of this description essentially refers to the security or protection, confidentiality and/or integrity of data as well as its transmission and also to the security, confidentiality and/or integrity of access to such data. Authentication in data transfers or data access is also covered by the term "security" as it is used in the context of this description. A module can be characterized as a hardware and/or functional unit that can be implemented as software and/or firmware. The function can be executed, for example, by means of a processor and/or a storage unit for storing program commands.

In a certificate-based system, each person or object receives an authentication certificate, such as a digital certificate, that contains information about its identity and a public key of the person or object. Each certificate is certified by an issuing authority by means of a digital signature, which in turn can be certified again by higher authorities. The trust system of such a Private Key Infrastructure PKI is strictly hierarchical. The common trust anchor is formed by a so-called root certificate, which must be authentically configured in all relevant system components.

The authenticity and integrity of a digital certificate are also verified by the digital signature. To do this, a value called a digital signature is calculated for a record using a secret signature key, also known as a private key. This value allows anyone to verify the non-deniable authorship and integrity of the record using the associated public verification key, also known as a public key. In order to be able to assign a signature created with a signature key to a person, the associated verification key must be assigned to that person beyond any doubt.

In a device certificate, the identity of the device, such as a serial number or MAC address of the device, is bound to a public key of the device. Device certificates from the manufacturer are preferably already applied during production and also act as confirmation of authenticity for the device. These device certificates usually have a very long period of validity so that the device can use this certificate during its entire period of use, for example, to act as a trust anchor for requesting or creating further operational device certificates for operational use. For each certificate, the issuing certification entity's certificate and, if applicable, any intermediate certificates up to the trusted root certificate, must also be available and valid for a corresponding period of time.

A certification entity is also generally referred to below as a device for issuing, or issuing device for, certificates. It is also possible to store secret symmetric and private asymmetric keys in specially physically protected security modules such as cryptographic processors, hardware security modules (HSM), or trusted platform modules (TPM). A security module can also be implemented as software/firmware. Secret or private keys can be imported into or generated in the security module. It is usually not possible, or only in a very limited way, to read out the keys from the security module. Cryptographic algorithms using the stored key are usually executed in the security module itself. Authentication is often required to use the keys, for example by transferring a secret number or password to the security module.

Many products are nowadays not produced by the owner of the brand itself in its own factories, but in contract producers' factories on behalf of the owner of the brand. For some products such as textiles, leather goods, etc. it has been common practice for decades to have the products manufactured abroad (e.g. in low-wage countries in the Far East) and then to sell them in different countries under their own brand label.

A problem then arises for the owner of the brand if the contract producer manufactures the products in larger quantities than agreed and illegally places this surplus on the market on its own behalf. Since the products were manufactured in the same factories and by the same employees and machines, there is no longer any technical distinction between the original and the plagiarized copy. It may therefore be important for the owner of the brand to be able to monitor its contract producers in an appropriate manner. The method of "digital certificates" in particular is enjoying increasing popularity, as digital certificates are in principle simple and inexpensive to produce even in very large quantities, and practically impossible to counterfeit. For this purpose, a new, asymmetric key pair is generated for each device. The private key must remain in the device and be reliably protected against unauthorized use and, in particular, against reading and copying; the public key is transported in an authenticated manner to a Certification Authority, abbreviated to CA, that can be configured as an issuing device which digitally signs it together with other device data (serial number, type, manufacturer name, production date, etc.).

Whether the owner of the brand operates the issuing device itself or has it operated by a trustworthy third party, they can easily determine the exact quantity of certificates generated. Since the contract producer requests a new certificate for each device, the CA also knows the number of devices that are legitimately produced. It is already known from EP 3288 215 A1 that the number of already generated digital signatures is verified by a security module before another digital signature is generated.

However, this assignment only applies exactly if the contract producer actually requests a new certificate for each device. This is certainly the case if the key pair belonging to the certificate was generated on the produced device in hardware (i.e. in a hardware security chip) and the private key cannot be read out; the contract producer is then forced to request a new certificate for each device. If, on the other hand, the contract producer is able to obtain a manufacturer certificate from the CA for a key pair for which he knows the private key, he can use the private key and the associated certificate on multiple devices and thus clone devices (with the same serial number).

DE 10 2010 033231 A1 describes a method and a server for the tamper-proof provision of a key certificate for a public device key of a user device which is installed at a user's premises, by a server of a service provider which provides the user with a service via the user device, wherein the server provides the key certificate to the user device if a signing request message received from the user device is successfully verified by the server using a one-time password generated for the user device by the server.

DE 10 2011 004469 A1 describes a method and a device for securing location-related messages which are transmitted by a provider to a plurality of time-varying recipient persons and recipient devices in a plurality of localities. Further prior art is formed by the publications DE 10 100 17 644 A1 and US 2017/353435 A1.

SUMMARY

The teachings of the present disclosure may be employed to improve methods and devices or systems relative to the above-mentioned prior art. For example, some embodiments of the teachings herein include a method for providing a proof of origin (AN) for a digital key pair (P, Q), comprising the following steps: generating the digital key pair (P, Q) at an origin (C) specified by a device (D), wherein the specified origin (C) is a security module (C) of the device (D), wherein the private key (P) of the digital key pair (P, Q) is stored in the security module (C) of the device (D), protected against access, providing the proof of origin (AN) which confirms the generation of the digital key pair (P, Q) at the specified origin (C) and is protected by a secret key (G1; GS) provided by the same device (D), wherein the secret key (G1; GS) is provided in the security module (C), and issuing the public key (Q) of the generated digital key pair (P, Q) together with the proof of origin (AN).

In some embodiments, the issued public key (Q) is used together with the proof of origin (AN) for requesting (ZA) at least one authentication certificate (Z), in particular at least one device certificate.

In some embodiments, the validity of the said request is checked, wherein the validity is ensured if the specified origin (C) of the digital key pair (P, Q) is guaranteed and/or verified based on the proof of origin (AN).

In some embodiments, a method further includes: generating an authentication certificate (Z) for the public key (Q) if the said validity is given, and issuing an authentication certificate (Z).

In some embodiments, the secret key (G1; GS) is only stored and kept within the device (D) at the specified origin (C) of the digital key pair (P, Q).

In some embodiments, the secret key (G1; GS) is only applied to data present at the specified origin (C).

In some embodiments, the secret key is a symmetric group key (GS), and that a symmetric method, in particular the keyed-hashing for message authentication (HMAC) method, is used with the symmetric group key (GS) to establish the proof of authenticity (AN) of the digital key pair (P, Q).

In some embodiments, the secret key is a private key (G1 of an asymmetric key pair (G1, G2), and that an asymmetric method, in particular a digital signature, is used to establish the proof of authenticity (AN) of the digital key pair (P, Q) using the private key (G1).

As another example, some embodiments include a security module (C) for providing a proof of origin (AN) for generating a digital key pair (P, Q), comprising: a generating unit designed to generate the digital key pair (P, Q), an access-protected storage unit for the private key (P) and for a secret key (G1; GS), a provision unit designed to provide the proof of origin (AN) which confirms the generation of the digital key pair (P, Q) at the specified origin (C), the specified origin (C) being the security module (C), and which is protected by means of the secret key (G1; GS), and an issuing unit designed to issue the public key (Q) of the generated digital key pair (P, Q) together with the proof of origin (AN).

As another example, some embodiments include a device (D) which is suitable for requesting at least one authentication certificate (Z), in particular at least one device certificate, comprising: a security module (C) as described herein and a processing and issuing unit (V) designed to generate and output the said request (ZA).

As another example, some embodiments include a system (W) for checking the validity of a request (ZA) for at least one authentication certificate (Z), wherein the validity is ensured when a specified origin (C) of a digital key pair (P, Q) is guaranteed and/or verified using a proof of origin (AN), with the specified origin (C) being a security module (C) of a device (D).

As another example, some embodiments include a device (CA) for issuing at least one authentication certificate (Z), in particular at least one device certificate, comprising: a device (W) as described herein, a generating unit (E) designed to generate the at least one authentication certificate (Z), and an issuing unit (A) designed to issue the at least one authentication certificate (Z).

As another example, some embodiments include a computer program product that can be loaded directly into a memory of a digital processor, comprising program code sections that are suitable for carrying out the steps of the method as described herein.

BRIEF DESCRIPTION OF THE DRAWINGS

The properties, features, and advantages of the teachings of the present disclosure and the manner in which these are achieved will become clearer and more comprehensible in conjunction with the following description of the exemplary embodiments, which are explained in more detail in connection with the drawings. In the drawings, in schematic form.

DETAILED DESCRIPTION

Figure 1:
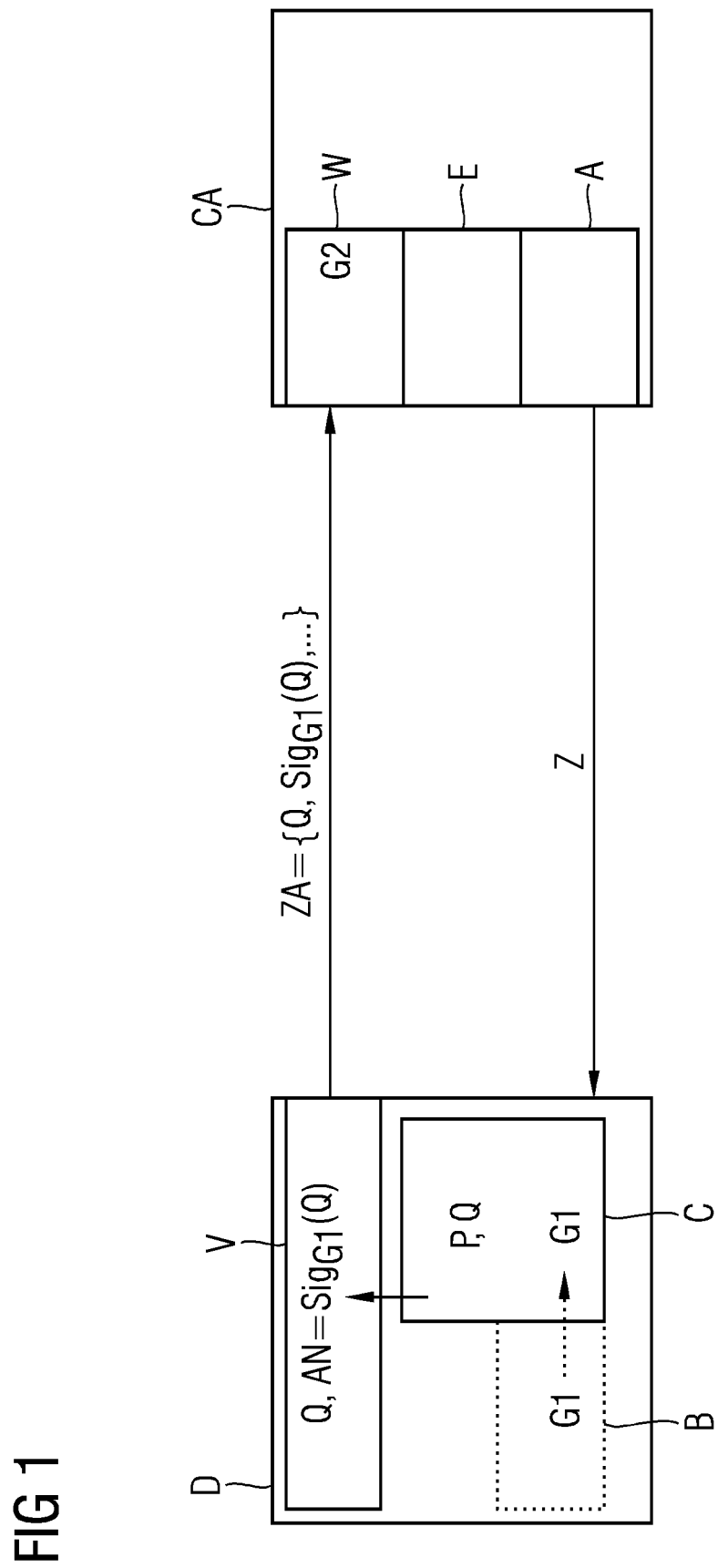
FIG. 1 shows a block diagram of an exemplary embodiment of a device incorporating teachings of the present disclosure for requesting or issuing authentication certificates when using an asymmetric cryptographic protection method for the proof of authenticity.

Various embodiments of the teachings herein include a method for providing a proof of origin (AN) for a digital key pair, comprising the following steps:

generating the digital key pair at an origin specified by a device, wherein the private key of the digital key pair is stored in the device, protected against access, providing the proof of origin which confirms the generation of the digital key pair at the specified origin and is protected by a secret key provided by the same device, and issuing the public key of the generated digital key pair together with the proof of origin.

Some embodiments include a security module for providing a proof of origin for generating a digital key pair, comprising:

a generating unit designed to generate the digital key pair, an access-protected storage unit for the private key and for a secret key, a provision unit designed to provide the proof of origin which confirms the generation of the digital key pair at the specified origin and which is protected by means of the secret key, and an issuing unit designed to issue the public key of the generated digital key pair together with the proof of origin.

Some embodiments include a device which is suitable for requesting at least one authentication certificate, in particular at least one device certificate, comprising:

a security module, in particular of the type mentioned above, and a processing and issuing unit designed to generate and output the said request.

In some embodiments, the device can be an IOT device or other device that comprises a security module, for example. The device or the security module can use a secret key for the (group) authentication of the public keys of key pairs generated in the device, preferably in the security module, in order thereby to prove the location of origin or generation of the key pair. This key can be used in requests when rolling out at least one authentication certificate, thus ensuring that only key pairs generated in the device or security module are (or can be) used for the authentication certificate. Otherwise, the creation of an authentication certificate is denied.

This ensures that the private keys associated with the authentication certificates are protected against compromise and that the contract producer cannot use a private key and the associated authentication certificate for multiple devices.

In some embodiments, the issued public key, together with the proof of origin, is used to request at least one authentication certificate, in particular at least one device certificate. The said request is preferably checked for validity, with the validity being ensured if the origin of the key pair is guaranteed and/or verified by means of the proof of origin.

In some embodiments, the methods include:

generating an authentication certificate for the public key if the said validity is ensured, and issuing an authentication certificate.

In some embodiments, the requester of an authentication certificate, specifically a device certificate, can explicitly prove the origin of the key pair to the issuing authority. The private key belonging to the requested authentication certificate can be protected according to the policies specified by the issuing authority; the issuing authority can check/verify the validity of this proof (of origin) and thus monitor and enforce compliance with its policies. This is also of particular interest when creating TLS server certificates and certificates for subordinate certification authorities.

In some embodiments, the secret key is only stored and kept within the device at the origin of the digital key pair. In one embodiment of the invention the secret key can only be applied to data present at the origin and not to data located outside the origin.

In some embodiments, the secret key is a symmetric group key and that a symmetric method, in particular the keyed-hashing for message authentication method (abbreviated to HMAC), is used with the symmetric group key to establish the proof of authenticity of the digital key pair.

In some embodiments, the secret key is a private key of an asymmetric key pair, and that an asymmetric method, in particular a digital signature, is used to establish the proof of authenticity of the digital key pair using the private key.

Some embodiments include a system for checking the validity of a request for at least one authentication certificate, wherein the validity is ensured if the origin of the digital key pair is guaranteed and/or verified by means of the proof of origin.

Some embodiments include a device for issuing at least one authentication certificate, in particular at least one device certificate, comprising:

a system as described herein, a generating unit designed to generate the at least one authentication certificate, and an issuing unit designed to generate the at least one authentication certificate.

Some embodiments include a computer program (product) is provided, comprising program code which can be executed by at least one processor and which causes the at least one processor to execute the (operating) method described herein. The computer program can run on a device of the above-mentioned type or be stored on a computer-readable medium as a computer program product.

The devices, systems, modules, and computer program (products) may be designed according to the extensions/embodiments of the above-mentioned method and their extensions/embodiments, and vice versa.

FIG. 1 shows a device CA for issuing authenticity certificates Z incorporating teachings of the present disclosure. If the device CA issues authentication certificates Z in the form of signed certificates, this is also referred to as a certification authority. An authority requiring or requesting an authentication certificate is represented as a device D, which can be a product of the type mentioned above. The device D can comprise a security module C, e.g. a cryptographic processor (security chip), HSM (hardware security module) or TPM (trusted platform module) as well as a processing and issuing unit V and a provision unit B, which can also be integrated into the security module C.

The device D in a security module C generates a key pair P, Q for use for an authentication certificate Z. The security module C stores the private key P internally, protected against access, and issues the public key Q externally to the device D.

The provision unit B is designed to provide the security module C with a secret key G1 to generate a proof of authenticity AN. This provision unit B may be contained in the security module C (however, shown coupled to the security module in FIG. 1), so that the key G1 can be particularly well protected against reading and copying. In some embodiments, the key G1 cannot be addressed from outside the security module C and cannot be applied to data originating from outside the security module C, rather it is only applied internally in the security module C to generate proofs of authenticity AN for public keys Q generated in the security module.

The key G1 can be realized as a private asymmetric key. In this case, a system W that checks the proof of authenticity AN must contain only the public key G2, which can also be generally known, belonging to the private key G1; the private key G1 must/should not be known outside the security module or a series of similar security modules. For example, the proof of authenticity can be implemented as a signature using the public key Q: AN=$\text{Sig}_{G1}$(Q).

In some embodiments, a processing and issuing unit V can be integrated into or coupled to the security module C within the device D and may be designed to provide a requirement or request for an authentication certificate ZA, such as a certificate request, that contains the key Q and the proof of authenticity AN. The processing and issuing device V generates a certificate request ZA according to e.g. PKCS #10 (Certification Request Syntax Specification [rfc2986], CMP message (Certificate Management Protocol [rfc4210]), etc. It contains the key Q, the proof of authenticity AN, and preferably other data that should be contained in the certificate Z, such as device data (serial number, type, etc.). The certificate request ZA or parts of it can also be signed with the generated private key P.

The certificate request, which is indicated in FIG. 1 by ZA={Q, $\text{SIG}_{G1}$ (Q), . . . }, is transferred to the issuing device CA.

In some embodiments, the transfer can be carried out via a wired communication interface or radio transmission interface. If a device certificate (manufacturer or operational) is already present in device D, this certificate may also be used for the secure transfer of the certificate request.

Figure 2:
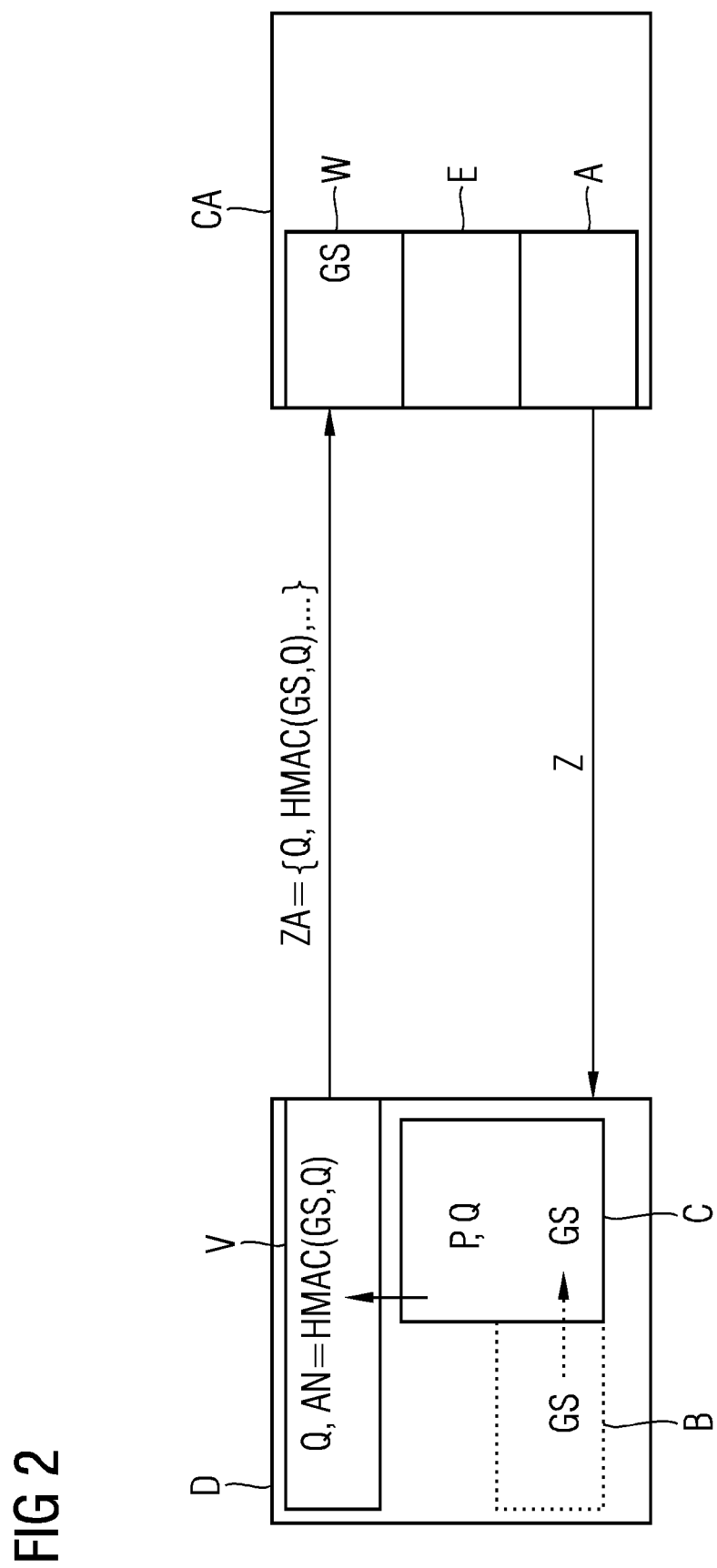
FIG. 2 shows a block diagram of an exemplary embodiment of a device incorporating teachings of the present disclosure for requesting or issuing authentication certificates when using a symmetric cryptographic protection method for the proof of authenticity.

Considering FIG. 2, then in principle a symmetric cryptographic procedure runs in the same way as the procedure in FIG. 1. The key GS (GS instead of G1) is a symmetric key, which is not divided into a private and public part. For example, for protection of the key Q a keyed-hashing for message authentication (HMAC) method is used, which is described in document rfc2104 from the IETF organization. The above-mentioned rfc documents are also published by this organization.

In some embodiments, the security module C is pre-personalized with a symmetric key GS, which is only known to the brand owner of the product or its CA operator. The certificate request is indicated in FIG. 2 by ZA={Q, HMAC (GS, Q), . . . }.

According to both figures, on the side receiving the request, the system W belonging to the issuing device CA checks the validity of the proof of authenticity AN using the public key Q: a digital signature $\text{Sig}_{G1}$ (Q) using the public part G2 of the asymmetric group key or an HMAC HMAC (GS, Q) using the symmetric key GS. The validity is ensured when the origin and/or place of generation of the key Q is guaranteed and/or can be verified using the secret key, in the example the asymmetric G1/G2 or symmetric key GS.

In the example, it may be guaranteed or verified that the key pair P, Q being used was generated in a device D, even better in a security module C, and the private key P cannot be read out. A generating unit E of the issuing device CA generates the digital signature for the authentication certificate Z only if the said validity is ensured. An output device A issues the authentication certificate Z with the generated digital signature, which is transmitted to the device D via the same or another wired communication interface or radio transmission interface. The device D checks the received authentication certificate to see if it matches the private key P.

The methods described herein are independent of the certificate management protocol used. It is not necessary for this protocol to be implemented in the security module, but it is sufficient if the security module protects the public key Q with a symmetric or asymmetric method.

In some embodiments, when a new key pair P, Q is generated in the security module and the public key Q is issued in plain text, the latter is already automatically protected with the key (G1 or GS); this key is used only for authentication and integrity protection of the public portion of internally generated key pairs and cannot be used in functions that can be called externally. For this embodiment, a specific functionality is implemented in the security module, which in the example can be implemented by the unit B, assuming this is integrated into the security module C.

Such embodiments are also of particular interest for the creation of (issuing) CA certificates or signature certificates, the operators of which want to verify, or must verify on the basis of a policy of the root CA operator, to a higher-level certificate authority (Root CA) that the private key is particularly secured.

In some embodiments, the new key pair is also generated in the security module and the public key Q is issued in plain text, however, initially without protection by the key G1 or GS. Therefore, it makes sense that in device D (e.g. in the firmware)—outside the security module C, in the example in the provision unit B—the public key Q is transferred to the security module again for protection with HMAC or signing. This is already possible with standard security modules that have a corresponding key, but offers less security, since in principle this method could also be used to protect other data—such as public keys generated outside the security module—using the key G1 or GS. However, the method is also entirely applicable in this case, since the effort required to create a firmware that has been manipulated accordingly is significantly higher for an untrusted contract producer than in the case in which it simply sends an arbitrary certificate request to the issuing device CA via its infrastructure.

Verification of the validity of the authentication certificate request ZA or certificate request or of the proof of authenticity AN of the public key Q in the certificate request does not necessarily have to be carried out directly by the issuing device CA; instead, an upstream unit not shown in the figures, such as a CA gateway in the Trust Center of the CA, or a Registration Authority (RA) belonging to the brand owner, can perform this task.

Such embodiments are also of particular interest for devices with manufacturer certificates, which do have security modules but their security modules do not have the functionality of the first embodiment mentioned above.

The group of security modules (above-mentioned first embodiment) or devices (above-mentioned further embodiment) that use the same key G1 or GS can vary in size, for example:
  all security modules or security chips manufactured for devices of the same customer (brand owner)
  all security modules or security chips of a production batch
  all devices of a model range
  all devices with the same firmware version
  all devices of a production batch
  etc.

In some embodiments, each security module or device uses a different "group" key, i.e. the "group size" is then one. However, the effort required to transfer the group keys from the chip manufacturer or firmware manufacturer to the certificate entity increases with the number of groups used. If multiple different keys G1 or GS are used within a system, it may be necessary to add an additional identifier to the proof of authenticity AN, from which a checking authority can detect which of the keys G1 or GS was used.

When using a CMP message, the following structure can be used to implement the certificate request:

```
CertRequest ::= SEQUENCE {
    certReqId         INTEGER,     -- ID for matching request and reply
    certTemplate      CertTemplate, --Selected fields of cert to be issued
    controls          Controls OPTIONAL } -- Attributes affecting issuance
CertTemplate ::= SEQUENCE {
    version           [0] Version              OPTIONAL,
    serialNumber      [1] INTEGER              OPTIONAL,
    signingAlg        [2] AlgorithmIdentifier  OPTIONAL,
    issuer            [3] Name                 OPTIONAL,
    validity          [4] OptionalValidity     OPTIONAL,
    subject           [5] Name                 OPTIONAL,
    publicKey         [6] SubjectPublicKeyInfo OPTIONAL,
    issuerUID         [7] UniqueIdentifier     OPTIONAL,
    subjectUID        [8] UniqueIdentifier     OPTIONAL,
    extensions        [9] Extensions           OPTIONAL }
extensions contains extensions that the requestor wants to have placed in the
certificate. These extensions would generally deal with things such as
setting the key usage to keyEncipherment.
```

For example, the proof of authenticity AN (HMAC or signature) can be transmitted in the controls field in a regToken (see RFC4211 Section 6.1). The proof of authenticity AN can also be appended outside the CMP message.

Although the teachings herein have been illustrated and described in greater detail by means of the exemplary embodiments, the scope of the disclosure is not restricted by the examples disclosed and other variations can be derived therefrom by the person skilled in the art without departing from the scope.

The processes or method sequences described above can be implemented on the basis of instructions which exist on computer-readable storage media or in volatile computer memories (hereafter referred to jointly as computer-readable memories). For example, computer-readable memories can be volatile memories such as caches, buffers or RAM as well as non-volatile memories, such as removable data carriers, hard drives, etc.

The functions or steps described above can exist in the form of at least one instruction set in/on a computer-readable memory. The functions or steps are not bound to a specific instruction set or to a specific form of instruction sets, or to a specific storage medium or to a specific processor or to specific implementation templates and can be implemented by software, firmware, microcode, hardware, processors, integrated circuits, etc. either in stand-alone operation or in any combination. A wide range of processing strategies can be used, for example, serial processing by a single processor, or multiprocessing or multi-tasking or parallel processing, etc.

The instructions can be stored in local memories, but it is also possible to store the instructions on a remote system and access them via network.

The device can comprise one or more processors. Each of the terms "processor", "central signal processing", "control unit" or "data evaluation means", comprises processing means in the broadest sense, thus for example, servers, universal processors, graphics processors, digital signal processors, application-specific integrated circuits (ASICs), programmable logic circuits such as FPGAs, discrete analog or digital circuits and any combinations thereof, including all other processing means known to the person skilled in the art or developed in the future. Processors in this context can consist of one or more apparatuses or devices or units. If a processor consists of a plurality of devices, these can be designed and/or configured for parallel or sequential processing or execution of instructions.

What is claimed is:

1. A method for restricting access to a device using a digital key pair, the method comprising:
    generating the digital key pair at an origin comprising a security module of the device;
    wherein the digital key pair includes a public key and a private key;
    wherein the private key is stored in the security module and protected against access;
    wherein the security module comprises at least one of: a cryptographic processor, a hardware security module, and/or a trusted platform module;
    providing a proof of origin confirming generation of the digital key pair at the origin, wherein the proof of origin is protected by a secret key stored in the security module;
    wherein the secret key comprises a group key issued by a central authority, wherein the group key is valid for a group of devices including at least one of: all security modules or security chips manufactured for devices of a single customer, all security modules or security chips of a single production batch, all devices of a model range, or all devices of a single production batch; and
    issuing the public key together with the proof of origin;
    wherein the public key and the proof of origin are both required for creation of an authentication certificate.

2. The method as claimed in claim 1, further comprising using the issued public key together with the proof of origin to request the authentication certificate.

3. The method as claimed in claim 2, further comprising checking a validity of the request, by checking whether the origin of the digital key pair is guaranteed and/or verified based on the proof of origin.

4. The method as claimed in claim 3, further comprising:
    generating an authentication certificate for the public key if the request is validated; and
    issuing an authentication certificate.

5. The method as claimed in claim 1, wherein the secret key is only stored and kept within the device at the origin of the digital key pair.

6. The method as claimed in claim 1, wherein the secret key is only applied to data present at the origin.

7. The method as claimed in claim 1, wherein the secret key is a symmetric group key, and a symmetric method is used with the symmetric group key to establish the proof of authenticity of the digital key pair.

8. The method as claimed in claim 1, wherein the secret key comprises a private key of an asymmetric key pair, and an asymmetric method is used to establish the proof of authenticity of the digital key pair using the private key.

9. A system for providing a proof of origin for generating a digital key pair including a public key and a private key, the system comprising:
- a processor programmed to generate the digital key pair; and
- an access-protected memory for the private key of the digital key pair and for a secret key;
- wherein the secret key comprises a group key issued by a central authority, wherein the group key is valid for a group of devices including at least one of: all security modules or security chips manufactured for devices of a single customer, all security modules or security chips of a single production batch, all devices of a model range, or all devices of a single production batch;
- the processor further programmed to provide the proof of origin confirming generation of the digital key pair at a specified origin including a security module and protected by the secret key; and
- the processor further programmed to issue the public key of the digital key pair together with the proof of origin, wherein the public key and the proof of origin are both required for creation of an authentication certificate;
- wherein the security module comprises at least one of: a cryptographic processor, a hardware security module, and/or a trusted platform module.

10. A non-transitory memory storing a computer program that can be loaded directly into a memory of a digital processor, comprising program code including a method comprising:
- generating the digital key pair at an origin specified by a device, wherein the origin comprises a security module of the device, wherein the digital key pair includes a public key and a private key, wherein the private key is stored in the security module protected against access;
- providing a proof of origin confirming generation of the digital key pair at the origin, wherein the proof of origin is protected by a secret key stored in the security module;
- wherein the secret key comprises a group key issued by a central authority, wherein the group key is valid for a group of devices including at least one of: all security modules or security chips manufactured for devices of a single customer, all security modules or security chips of a single production batch, all devices of a model range, or all devices of a single production batch; and
- issuing the public key of the digital key pair together with the proof of origin, wherein the public key and the proof of origin are both required for creation of an authentication certificate;
- wherein the security module comprises at least one of: a cryptographic processor, a hardware security module, and/or a trusted platform module.

* * * * *